B. C. STICKNEY.
COMBINED TYPE WRITING AND COMPUTING MACHINE.
APPLICATION FILED OCT. 21, 1913.
1,275,994.
Patented Aug. 13, 1918.
9 SHEETS—SHEET 1.
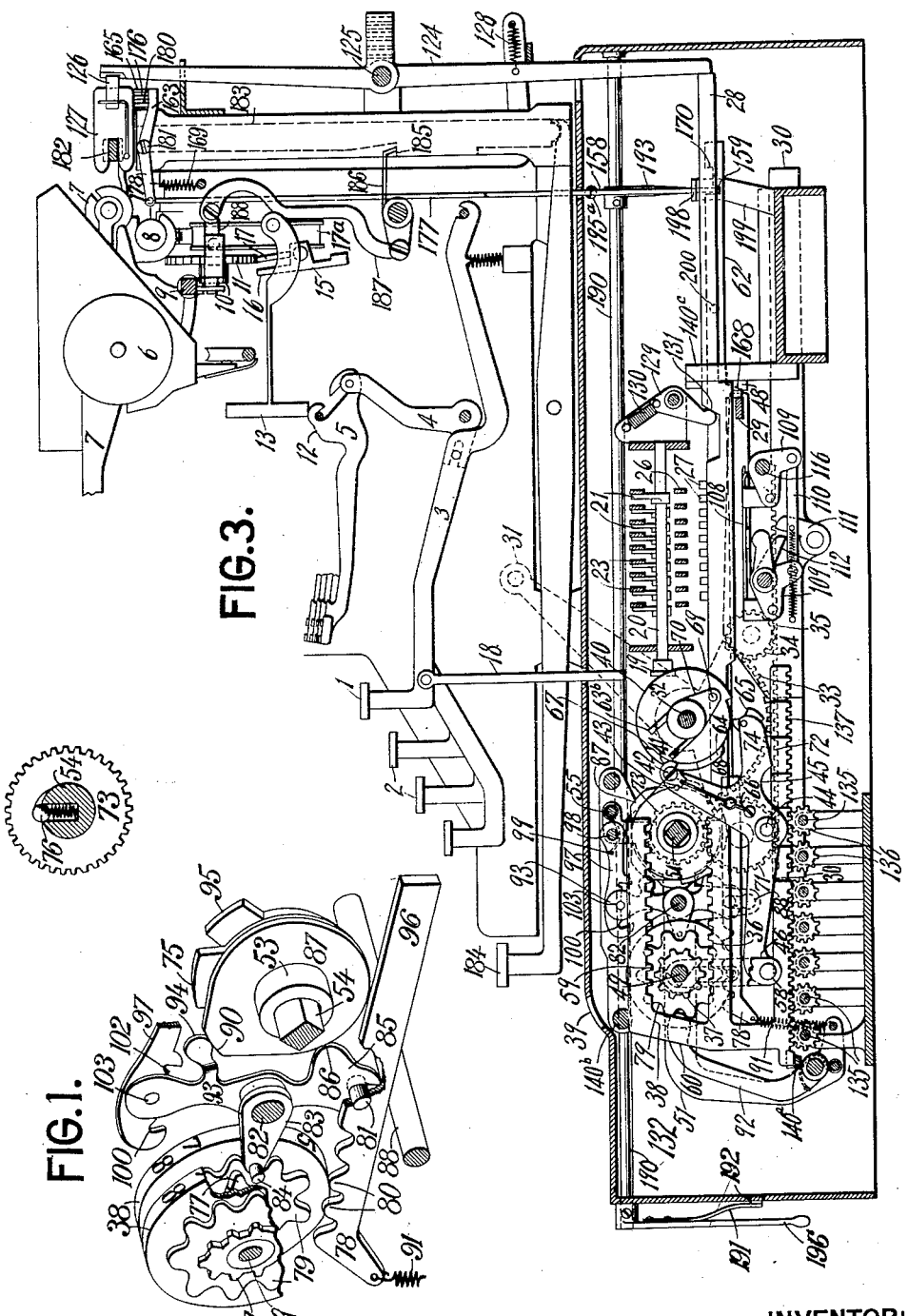
INVENTOR:
Burnham C Stickney
WITNESSES:
Julius Wudestine
F. E. Alexander B. C. STICKNEY.
COMBINED TYPE WRITING AND COMPUTING MACHINE.
APPLICATION FILED OCT. 21, 1913.

1,275,994.

Patented Aug. 13, 1918.
9 SHEETS—SHEET 2.

WITNESSES:

INVENTOR:

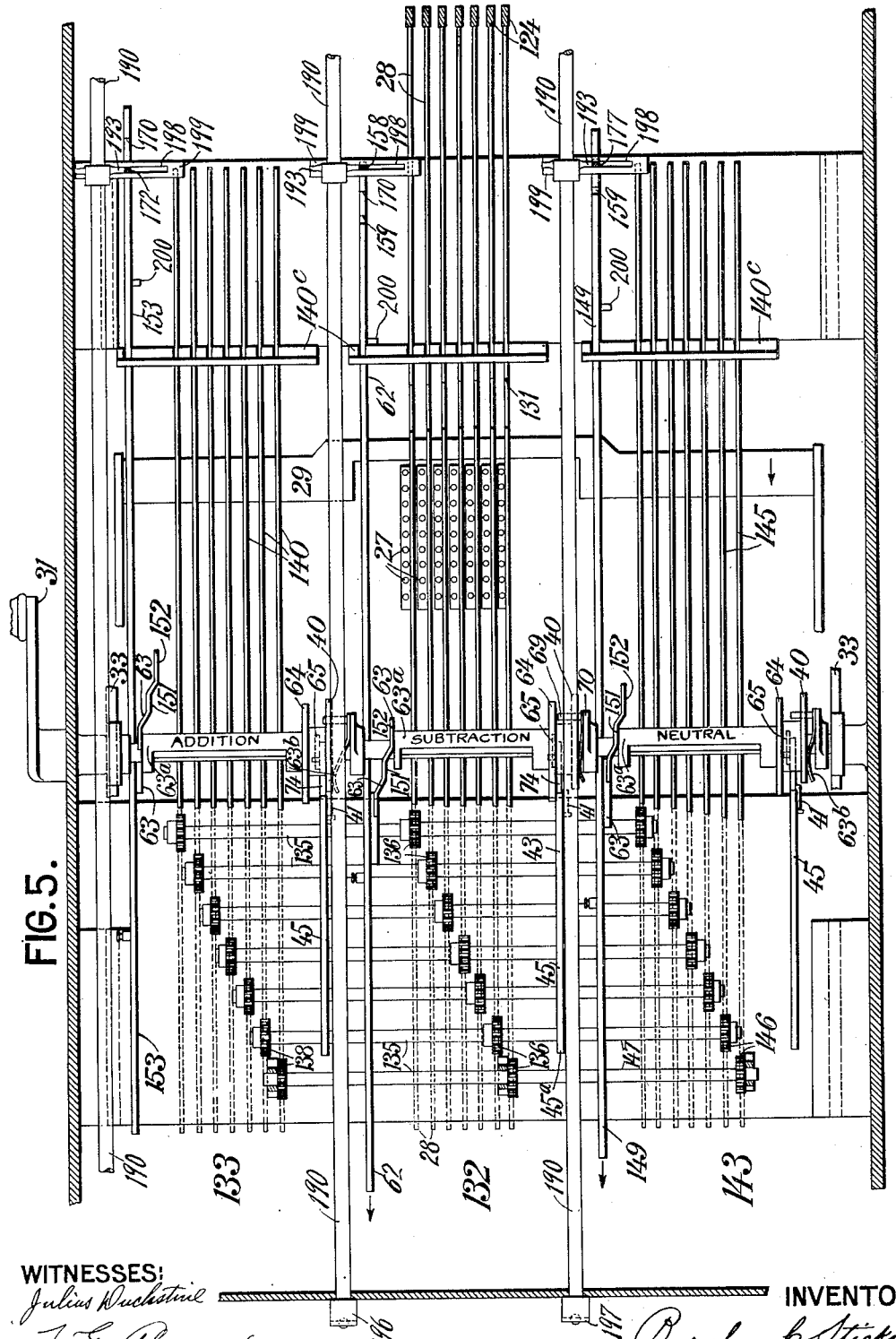

B. C. STICKNEY.
COMBINED TYPE WRITING AND COMPUTING MACHINE.
APPLICATION FILED OCT. 21, 1913.
1,275,994.
Patented Aug. 13, 1918.
9 SHEETS—SHEET 4.
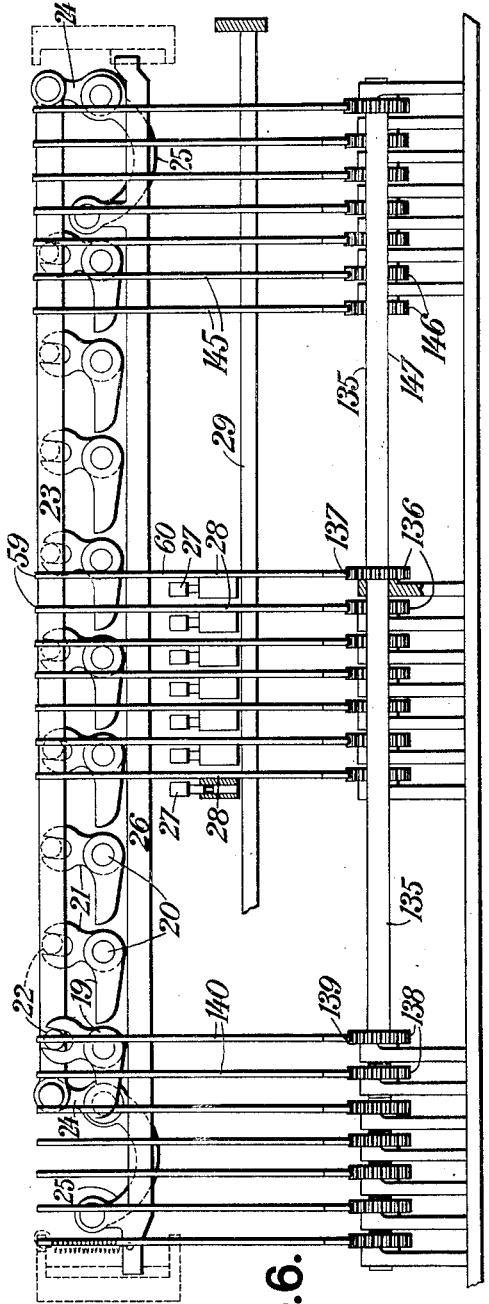
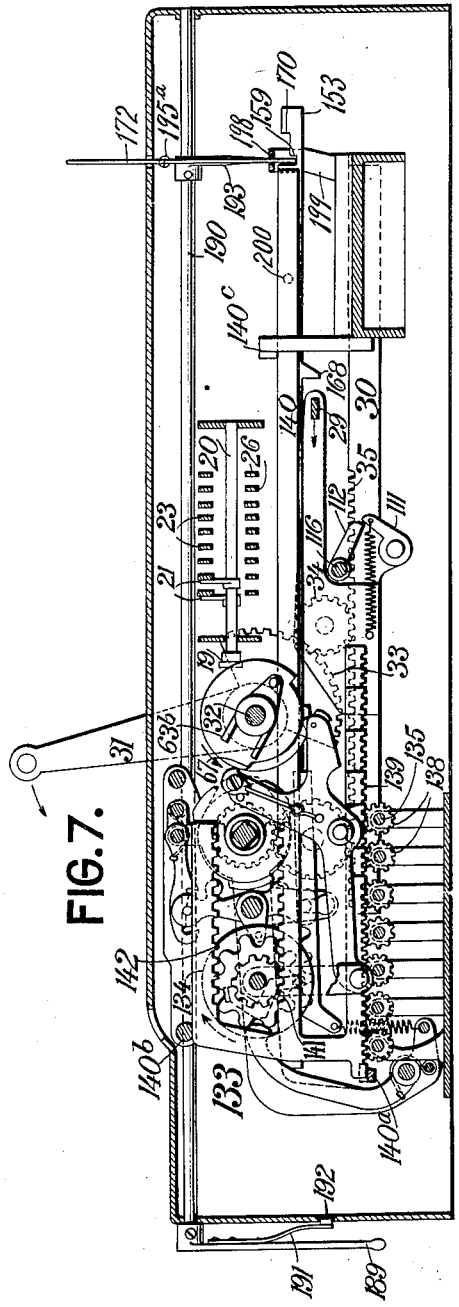
WITNESSES:
INVENTOR:
Burnham C Stickney

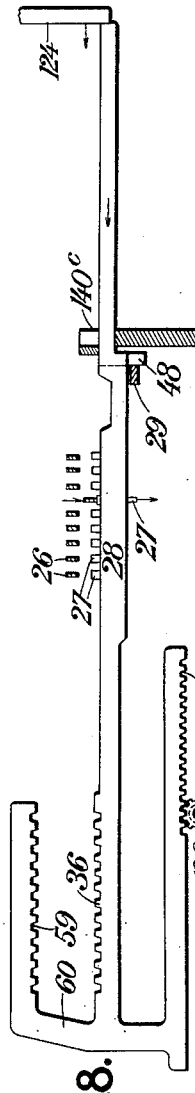
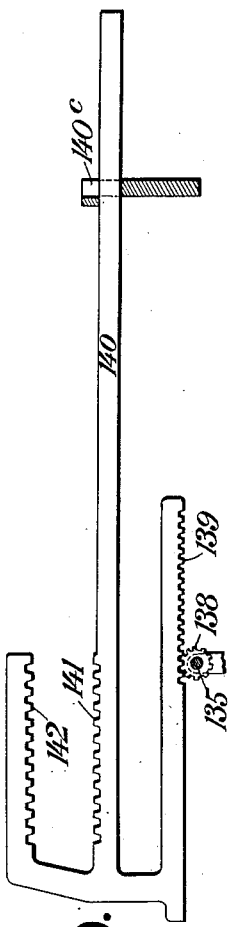
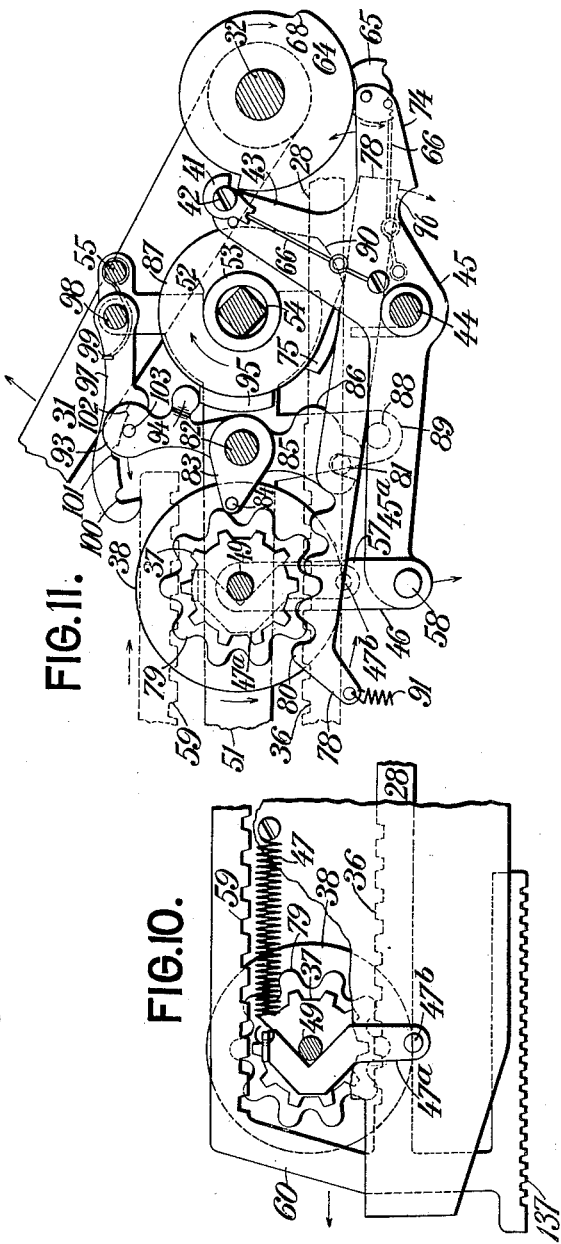

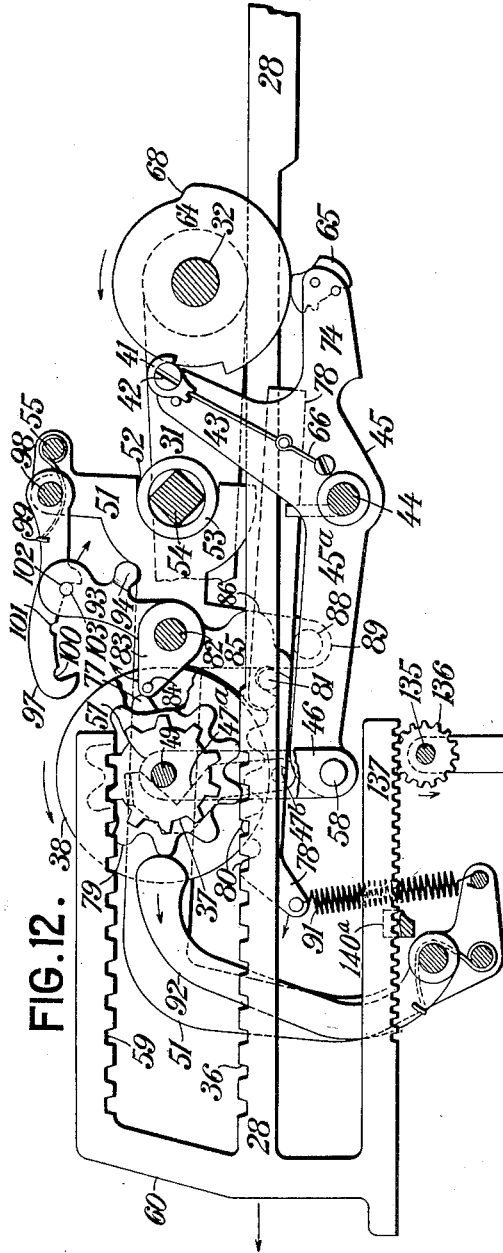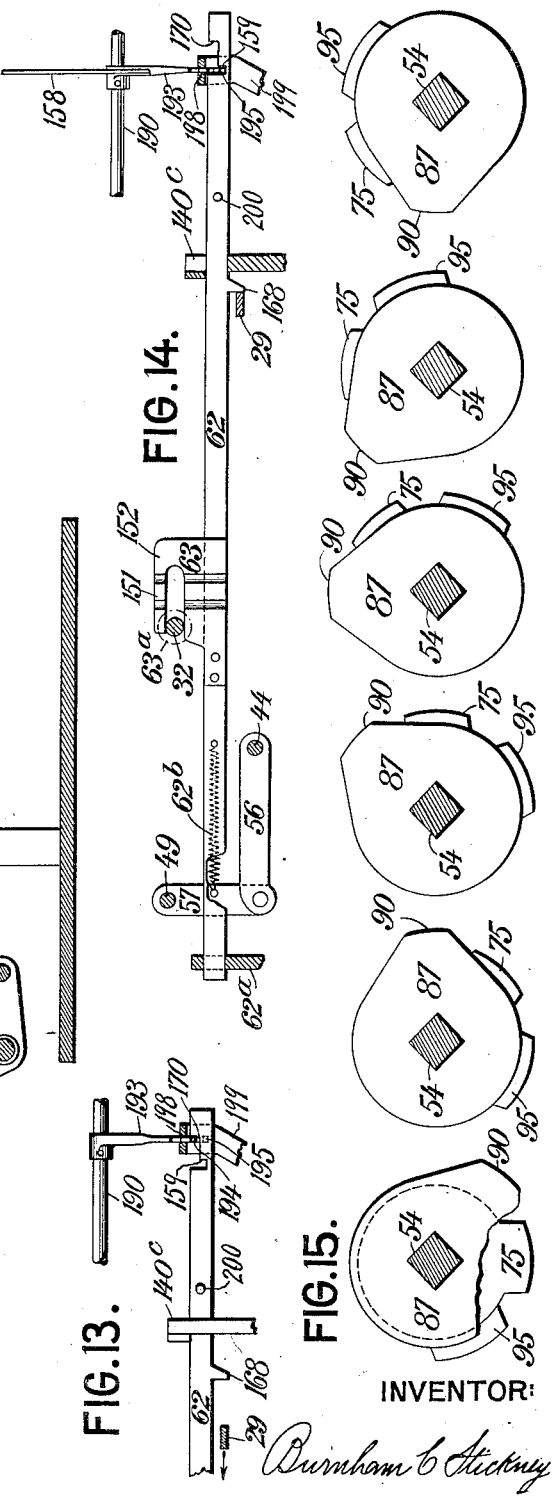

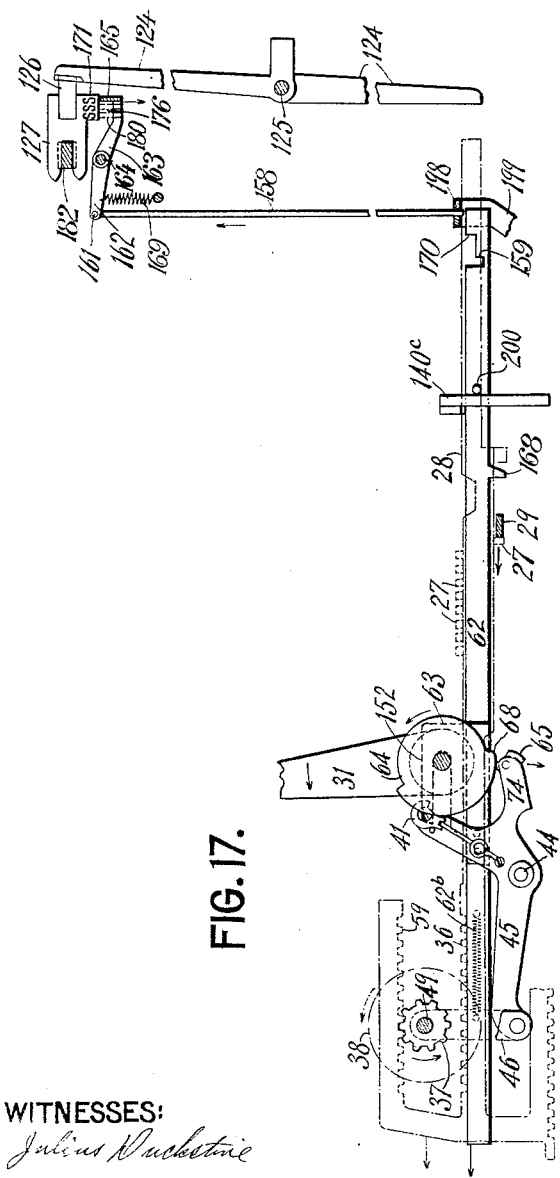
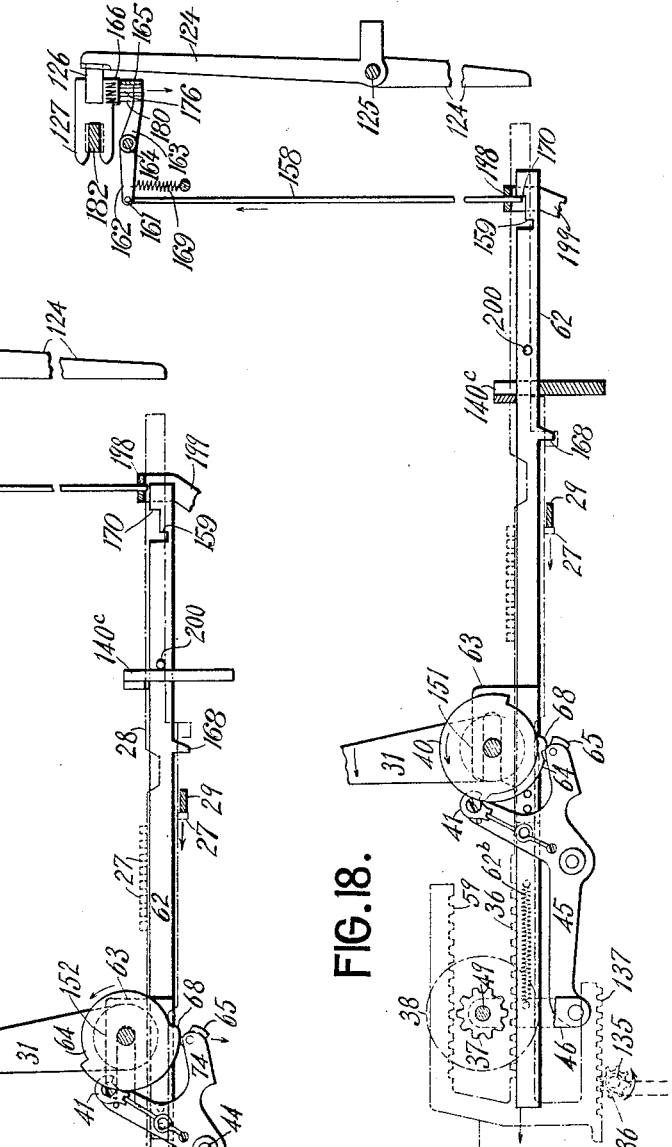

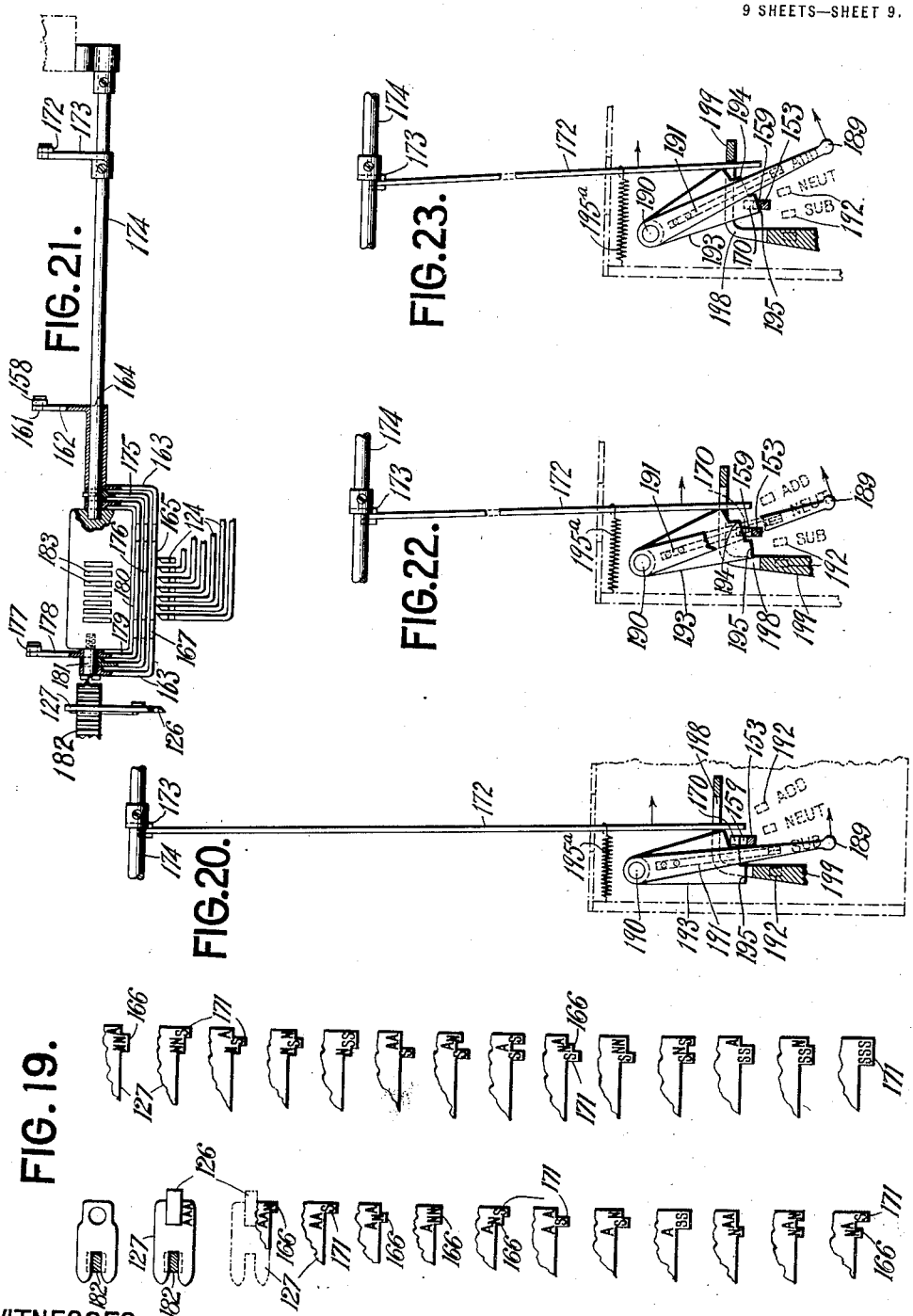

UNITED STATES PATENT OFFICE.

BURNHAM C. STICKNEY, OF ELIZABETH, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,275,994.      Specification of Letters Patent.      Patented Aug. 13, 1918.

Application filed October 21, 1913. Serial No. 796,426.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to computing machines of the kind in which the numeral keys set up indexing devices, which subsequently control the extent to which the number wheels or parts of a register or totalizer are turned by a general operator.

One of the principal objects of the invention is to provide improved means for effecting the operation of a plurality of registers.

Any suitable registering mechanism may be taken as a basis for a single register; and one or more additional registers may be operatively connected to the first register to be driven simultaneously therewith; whereby a single set of indexing devices may serve to control the extent of operation of several registers or totalizers.

This invention is preferably applied to machines in which a typewriting mechanism is combined with a computing mechanism. The carriage of the typewriter is usually employed for selecting the denominations, while the keys select the digits of the indexing mechanism; and a single setting of the index devices answers for two or more registers.

The wheels usually comprising a register in an Underwood-Hanson machine are usually driven by means of bars which are advanced by means of a general operator; said bars having racks to engage pinions on the number wheels. Said bars also carry index pins, and are also arranged to be displaced one by one by means of connections on the typewriter carriage at the index-setting operation.

The additional register or registers are provided with dead driving bars, that is, these additional driving bars do not carry any indexing devices, and are connected by means of cross connections to the wheel driving bars of the usual register, which is herein termed for convenience, the main or major register.

Each of the main register driving bars has an additional rack, which is connected by a train of gearing with the corresponding bar on each of the other registers; said train of gearing preferably comprising two pinions and a shaft on which they are mounted; one pinion meshing with the rack on the main driving bar, and the other meshing with the corresponding rack on the driven bar.

Each register is provided with a shiftable device so that it may be either adding or subtracting or silenced, while each of the remaining registers is either adding, subtracting or silenced. These shiftable devices are placed under the control of the typewriter carriage, so that whether the registers shall add, subtract or be neutral at the operation of the general operator, depends upon the position of the typewriter carriage, or in other words, depends upon the position of the column on the work-sheet in which the computation is being performed. Upon the carriage is placed a dog for selecting the digits of the indexing mechanism; and connected to this dog are devices to determine the operation of the aforesaid shiftable devices, which in turn control the computations of the several registers.

Each of said shiftable devices may be operated by a bar, and a spring normally tends to operate said bar. The bar is restrained by a latch, and the device which is adjustable along the carriage is adapted to withdraw said latch; said bar being afterward returned to normal position by the general operator against the tension of said spring.

Each latch is connected to a cam, which may be engaged by an adjustable tappet on the carriage; and preferably these cams are placed one behind another, so that the same tappet may control all of the cams, that is, may withdraw all of the latches simultaneously. Several of these combined digit-selecting dogs and cam-controlling tappets may be adjusted to different points along a rack on the carriage, to correspond to the positions which the several columns are to occupy on the work-sheet. Moreover, the tappets may be of various forms; for instance, the first tappet may be arranged to cause the first register to be set to addition, and the second and third to subtraction;

while the second tappet may be used to set the first register to subtraction, the second to neutral, and the third to addition, etc.; a great variety of combinations being possible.

If desired, there may be employed three or more registers, and the tappets may be arranged to perform addition on the first register as the first column is written, while the remaining registers are silenced. The second tappet may be arranged for the performance of addition on the second register as the second column is written, while the first register and the remaining registers are also silenced. So likewise at the third column addition may be performed on the third register, while all the remaining registers are silenced, and so on; so that the various registers may be singly operated in succession as the numbers are written in consecutive columns. These are only a few of the very wide range of combinations that may be employed. Preferably there is also a provision for manually controlling the condition of the registers.

The adjustable member which carries the digit-selecting dog and the condition-controlling tappets, may also serve as a column stop, to coöperate with the usual decimal or other counter-stops on the framework of the machine, so that, by selecting the proper tappet, the user may adjust it to any position on the carriage rack, and thereby determine the location of the column on the work-sheet, and also determine what the various registers shall do when the numbers written in said column are run into the registers, and also set the digit-selecting dog into position to coöperate in the proper manner with the index-pin setting devices.

Other objects and advantages will hereinafter appear.

In the accompanying drawings,

Figure 1 is a perspective view of one variety of tens-carrying mechanism which may be used in connection with the present improvements.

Fig. 2 is a sectional view of a clutch device.

Fig. 3 is a sectional elevation of a combined adding and typewriting machine of the Underwood-Hanson type, showing the present improvements embodied therein.

Fig. 5 is another sectional plan of the lower portion of the machine, omitting the registers, and showing the machine set for performing addition on the left-hand sub-register, and substraction on the major or middle totalizer, while the right-hand sub-register remains neutral.

Fig. 6 is a sectional front elevation showing the forward ends of the register operating bars and cross connections between the different sets of bars whereby one set may operate the other sets.

Fig. 7 is a sectional side elevation of the left-hand register and its appurtenances and connections; this section being taken at about the line x—x of Fig. 4. Addition is being performed on this register.

Fig. 8 is a side elevation of one of the bars which operate the major register, this bar carrying a series of index pins and also having addition and subtraction racks, and further provided with a rack for driving the corresponding bar in one or more other registers.

Fig. 9 is a view of a bar such as used for driving the sub-registers; said bar not having any indexing devices or any denominational selecting devices, but having a rack which is driven from the bar seen at Fig. 8.

Fig. 10 is a view of the forward part of the main totalizer showing the same as automatically held in normal position during the forward stroke of the general operator.

Fig. 11 is a view of the parts as seen at Fig. 3, but illustrating the tens-carrying operation.

Fig. 12 is a view similar to Fig. 11, but illustrating the subtraction operation.

Fig. 13 is a fragmentary side elevation of the rear portion of a condition-controlling bar and the device for manually controlling the same, the bar being shown in position for silencing the register.

Fig. 14 is a sectional side elevation to illustrate a subtracting key in its rearmost or adding position.

Fig. 15 shows a series of cams used in the tens-carrying operation in that style of register shown in the other drawings; but it will be understood that the present improvements may be applied to different kinds of registers.

Fig. 17 is a side elevation to show the method whereby the carriage tappet withdraws the latch to permit the spring to shift the condition-controlling bar forwardly to subtraction position. This view also shows the general operator as effecting subtraction upon a register.

Fig. 18 is a view similar to Fig. 17, but showing one of the registers as automatically silenced by means of its connection to the typewriter carriage; the general operator driving the racks forward idly so far as this register is concerned.

Fig. 19 shows a variety of forms of condition-controlling tappets, marked to indicate "addition," "subtraction" and "neutral."

Fig. 20 is a front view of a device for manually controlling the condition of a register; the device being shown as swung to substraction position, and the carriage-controlled device being swung to one side and silenced.

Fig. 21 is a plan of carriage-controlled cams which determine the condition of the register. This view also shows a fragment of the digit-selecting jacks or levers, and of the decimal tabulator stops.

Fig. 22 is a view similar to Fig. 20, but showing the manual device swung to position to silence its register.

Fig. 23 is also similar to Fig. 20, but showing the device swung to addition position.

Figure 4:
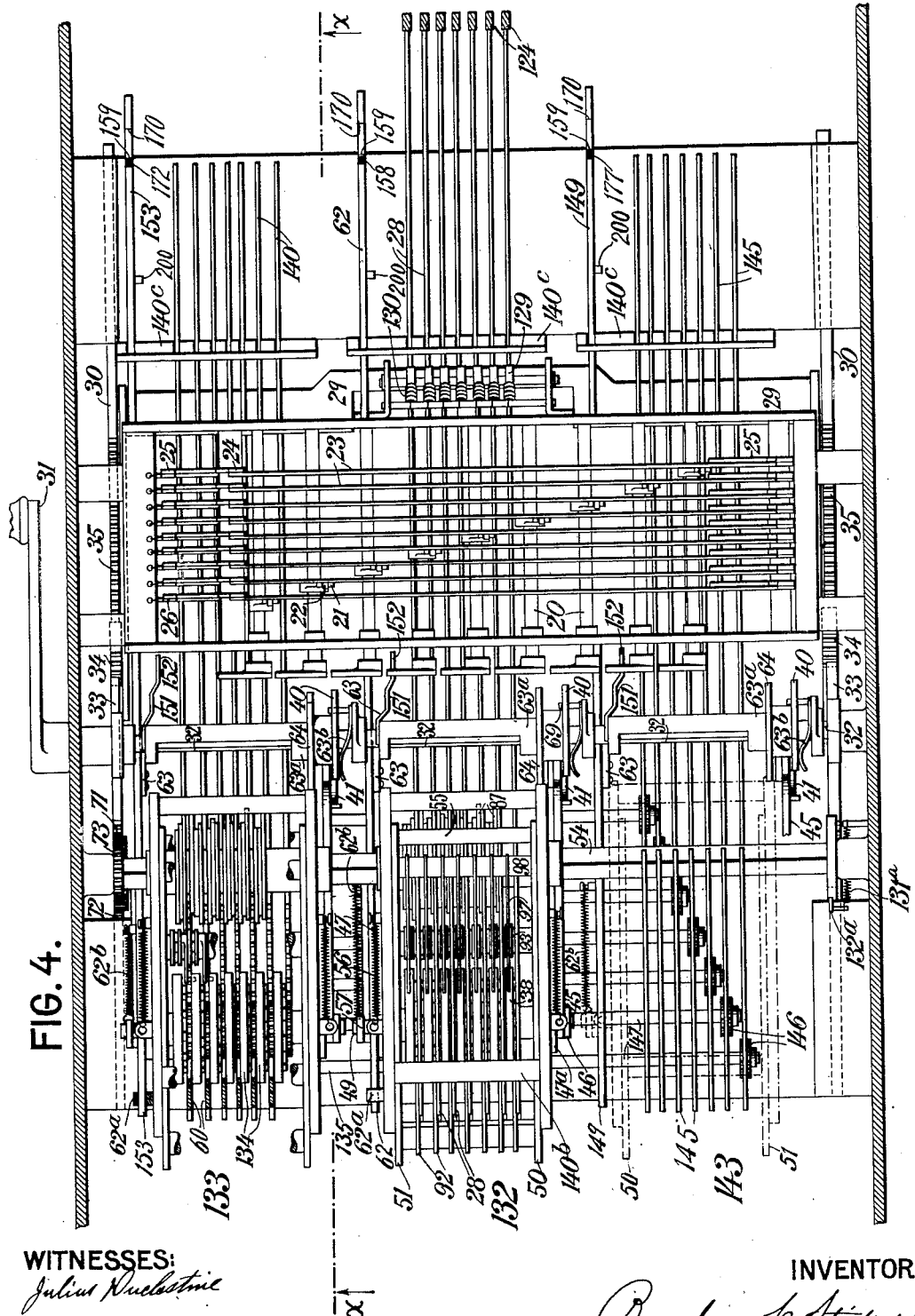
Fig. 4 is a sectional plan, showing all registers in condition for addition; and also showing the index mechanism and the bars which operate the various registers or totalizers.

Numeral keys 1 and alphabet keys 2 operate levers 3, 4, to vibrate type-bars 5 upwardly, to strike against the front side of a platen 6 mounted on a carriage 7 which travels on a rail 8, and is controlled by a rack 9 meshing with a pinion 10 connected to an escapement wheel 11.

Each type-bar has a heel 12 to engage a universal bar 13 mounted on a frame 14 which operates a rocker 15 having vibratory dogs 16, 17, to engage said escapement wheel and permit the carriage to feed step-by step under the impulse of the usual spring-barrel 17ª, Fig. 3.

The computing mechanism includes an index mechanism which is operable by the numeral keys; each key having a pendent rod 18 to engage and depress the corresponding one of a series of rock arms 19, which are arrayed across the machine, being mounted upon the forward ends of rearwardly extending horizontal rock shafts 20, forming parts of linkages which depress the index pins.

Each rock shaft carries an upstanding arm 21 to engage a wrist or pin 22 upon a horizontal link 23, which extends from side to side of the machine.

At its ends, each link connects a pair of bell cranks 24, the long arms 25 of which are connected by links 26 which descend to press down index pins 27. Each numeral key thus determines the value of the index pin which is depressed or selected, but the typewriter carriage 7 determines the denomination of the depressed pin; each link or depressor bar 26 being capable of depressing one pin in each denomination.

The index pins are arranged in rows upon bars 28, extending forwardly and rearwardly beneath the links 26, and serving eventually to rotate the number wheels in a manner presently to be described.

Normally the index pins are out of the path of movement of the depressor bars 26, but as the paper carriage 7 feeds step-by-step, the bars 28 are displaced forwardly one after another, to positions to bring their pins within range of the depressor bars 26 (see Fig. 8), so that any bar 26 may depress the corresponding pin of the forwardly displaced pin bar. Means for displacing the pin bars forwardly one after another during the movement of the paper carriage, will presently be referred to.

Such index pins as are depressed, project below the bars 28 on which they are carried, and serve as lugs whereby said bars may be driven endwise forwardly for turning the number wheels. They are driven by means of a universal driver in the form of a transverse horizontal bar 29 which forms part of a general operator which is operated once for every calculation.

The general operator in the Underwood-Hanson combined adding and typewriting machine comprises side bars 30 (Fig. 4) which are slid in guides on the side walls of the framework and are rigidly united to form, a slide or carriage; said cross bar 29 forming one of the devices for tying said bars 30 together. This carriage or general operator may be driven by a crank 31 which is fixed upon a transverse horizontal rock shaft 32, journaled at its ends in the framework of the machine, and carrying at its ends segments 33 which mesh with idle pinions 34, the latter meshing with racks 35 formed upon said general operator side bars 30.

A movement of the crank 31 forwardly from the Fig. 3 position causes the general operator to drive forwardly, and the bar 29 thereon engages any depressed index pins 27, and drives forwardly the bars 28 on which they are mounted.

At its forward end each of said index pin bars 28 carries an addition rack 36 normally out of mesh with a pinion 37, which is fixed to a number wheel 38 forming one of a gang, there being one pin bar 28 for each number wheel in said gang. These number wheels are arranged below a sight opening 39 in the casing of the machine.

The cross bar 29, which engages the depressed index pins, is placed some distance behind said pins, so as to permit considerable lost motion of the general operator before the first pin can be engaged by said cross bar, and during this lost motion, the racks 36 become meshed with the number wheel pinions 37. This result is effected in the following manner: Carried upon power shaft 32 and rotated thereby is a disk 40 having a cam 67, which, as soon as the crank 31 starts to turn, engages a rider or pawl 41 pivoted at 42 upon an arm 43 of a lever 45, which is fixed to and turns upon a transverse horizontal rock-shaft 44, and swings said lever from the normal position seen at Fig. 3 to the position seen at Fig. 7, so that a forwardly extending arm 45ª of said lever 45 may pull down, by means of a link 46, a framework which carries said number wheels on an arbor 49, thus bringing the pinions 37 into mesh with said adding racks 36. Hence as the general operator continues to drive forward under the impulse of the crank 31, the pinions are turned clockwise at Fig. 7, and the number wheels are turned in the same forward direction, thus performing addition; each number wheel being advanced to an extent dependent upon which of its index pins 27 was depressed.

After the crank 31 has been given a full forward stroke, it is swung backwardly to normal position to restore the general operator to its normal position. At the initial portion of the return stroke of the crank 31 and its shaft 32, the rider or pawl 41 turns counter-clockwise at Fig. 7 (the cam 40 now turning in the reverse direction from that indicated by the arrow at said figure), and by a very slight rotation of said pivot 42, said pawl is rendered no longer capable of supporting the arm 43. This permits springs 47 to draw rearwardly C-shaped or double cam levers or arms 47ª pivoted at 47ᵇ, which engage the ends of said arbor 49 and thereby raise said wheels clear of the rack bars 36, so that the parts 43 and 45 are restored to their normal positions.

This movement, which withdraws the pinions 37 from the addition racks 36, takes place before the racks themselves start upon their return or rearward movement to normal position; such return being preferably effected by the same cross bar 29 which previously carried the racks forward. The cross bar, for this purpose, engages lugs 48 pendent from the rack bars in the rear of the cross bar 29, but is arranged to have considerable idle rearward motion (enough to permit collapse of pawl 41) before engaging said lugs 48.

The arbor 49 on which the number wheels 38 and their pinions 37 are mounted, forms a tie-rod connecting the two sides 50 and 51 of a swinging frame, which has bearings or sockets at 52 to swing upon collars 53 carried by a transverse horizontal shaft 54; this shaft forming a convenient hinged support for said frame 50, 51, and keeping the computing wheels always in proper relationship to the shaft 54, which is connected to the general operator and carries certain prime moving tens-carrying devices, as will presently be explained.

The side members 50, 51 are also connected by a tie-rod 55. The arm 45ª of the shifting lever may be duplicated at 56, and the link 46 may be duplicated at 57; the shaft 44 forming a rigid connection between 45ª and 56, so that the links 46, 57, pull down both sides of the number wheel shifting frame 50, 51. The links 46, 57 may be pivoted at 58 to arms 45ª, 56.

Upon each of said index pin bars 28 is carried not only an addition rack 36, but also a subtraction rack 59, which is idle, as at Fig. 7, during the addition operation. This rack is parallel with the addition rack 36, but above the pinion 37; and is connected by an arm 60 with the forward end of the bar 28.

To cause the wheels 38 to subtract at the driving strokes of the index bars 28, it is only necessary to move the computation pinions 37 into mesh with the subtraction racks 59, instead of the addition racks 36, so that the number wheels will be turned backwardly at the ensuing forward drive of the index bars 28.

To determine whether the register shall add, subtract, or remain silenced at the operation of the general operator, there is employed a condition-controlling bar 62, (having an operating spring 62ᵇ). This bar extends from front to rear of the machine, and slides on a rest 62ª. Between its ends, this rod carries a general cam 63, which during the backward thrust of the rod, engages the end of a sleeve 63ª, (having a returning spring 63ᵇ), and forces the same endwise along the shaft 32, together with the cam disk 40, which is fast to said sleeve 63ª, thus displacing the latter and silencing the pawl 41. At the same time is brought into play a second disk 64 having a cam 68, also fast to said sleeve, which disk is effective only for the purpose of subtraction. Thus said bar 62 operates to shift the register-actuating mechanism from addition to subtraction.

This disk 64 is arranged to coöperate with a follower or pawl 65, which is out of line with the pawl 41, that is, it works in a different plane; the disk 64 being shifted into the same plane as its pawl 65 when the cam disk 40 is shifted out of engagement with the pawl 41.

During the ensuing forward stroke of the general operator, the cam disk 40 will rotate idly; but the cam disk 64, as seen at Fig. 3, will engage the follower or pawl 65, and thrust down the arm 74 of the lever 45 from normal midway position to the depressed position as seen at Fig. 12, thus drawing upwardly the links 46 and 57, thereby lifting the frame 50, 51, 88, and carrying the pinion 37 into mesh with the subtraction racks 59, so that the latter are enabled to turn the number wheels backwardly during the remainder of the forward stroke of the general operator. On the return stroke, the pawl 65 releases the arm 74, and then the cam arms 47ª draw the pinions 37 clear of the racks 59.

The means for controlling the position of the shiftable condition-controlling bars 62, will presently be explained.

The pawls 41 and 65 are provided with springs 66 which restore the pawls to normal positions at the end of the return stroke of the general operator. Normally springs 47 and arms 47ª, Figs. 3, 10, hold the lever 45 in its midway position, and the pawls 41 and 65 stand ready for engagement with their respective cams 67 and 68, as at Fig. 3.

These cam disks 40, 64 are splined to the shaft 32 by means of a pin 69 carried on an arm 70 fixed to said shaft, and passing through a hole in disk 40.

The carry-over devices comprise an idle pinion 71, meshing with a rack 72 on the general operator, to connect said operator with a pinion 73 on the horizontal transverse shaft 54 having a helical series of cams or tappets 75 for carrying tens at the addition operation. This shaft 54 turns in only one direction, and is operated only during the return stroke of the general operator; being for this purpose connected by a ball clutch mechanism 76 to the pinion 73, as seen in Fig. 2. A spring 131ª holds a detent 132ª, Fig. 4, to prevent backward rotation of the shaft 54.

Each number wheel (except that of lowest denomination) has an individual train of mechanism for connecting it to this power-driven tens-carrying shaft 54, but the train is normally broken, and hence the tappets or cams 75 are all normally ineffective. Each number wheel 38 (except that of highest denomination) has a starting tooth 77, the function of which is to establish a connection from the number wheel of next higher denomination to the tens-carrying shaft 54.

Each of the trains of connecting devices includes a pawl 78 to mesh with a gear 79 fixed upon the number wheel, the pawl having multiple teeth 80, or being in the form of a short rack, as shown. Each rack is normally out of mesh with its gear wheel 79, but the general operator operates means to shift its pawl up into mesh with its pinion, and the starting tooth 77 operates means to provide for the subsequent driving movement of the pawl.

To this end, the pawl 78 has a pin-and-slot connection at 81 with a two-armed lever or tumbler between the power-driven tens-carrying cams 75 and the number wheel rotating pawl 78; this lever being pivoted between its ends upon an arbor 82, and having a short arm 83 provided with a pin 84 in the path of said starting or setting tooth 77.

The number wheel 38 turns in the direction of the arrow, or clockwise, as at Fig. 7, to perform addition. The setting tooth 77, at the completion of a full revolution of said number wheel 38, engages and depresses the pin 84 together with the arm 83, swinging said lever, rocker or interponent.

The lower arm 85 of said lever or rocker has a slot to engage with the pin 81 on the tens-carrying pawl 78, which by the movement of the rocker, is drawn back from the normal position at Fig. 7. Upon said arm 85 is a cam-like tooth 86, which is swung into the path of the associated tappet 75 on the tens-carrying shaft 54, the function of the latter being to act upon said tooth 86, and thereby return the rocker forward to its normal position. During such return movement, the rocker arm 85 carries with it the pawl 78, which, however, has in the meantime been swung up into mesh with the gear 79 of the number wheel next higher than that which carries the setting tooth 77, whose movement has just been mentioned.

The forward swing of the pawl 78 is effected by the engagement of the tappet 75 with the rocker tooth 86, there being provided upon the tens-carrying shaft 54 a cam 87 which depresses the rear end 96 of the pawl 78 and lifts the forward end thereof into mesh with said gear 79 as at Fig. 11; the pawl being supported between its ends by a rod 88 which rigidly connects arms 89 pendent from the side plates 50, 51, thus forming part of the frame which comprises the arbor 49 and which extends forwardly from the collars 53 on said shaft 54, to rock up and down for shifting the adding pinions into and out of mesh with the driving racks 36.

By means of said pawl 78, the higher number wheel is advanced one point. The cam 87 has a continuation or dwell portion 90 which holds down the rear end 96 of the pawl 78 during the wheel driving movement, and which thereupon releases said pawl and permits the forward end thereof to be snapped down by a spring 91 out of mesh with the gear 79; a spring detent 92 engaging the latter to hold the number wheel in position.

At the subtracting operation, which includes what may be called tens-borrowing, the setting tooth 77 on the number wheel, which is traveling counter-clockwise (Fig. 12), lifts the arm 83 and swings the rocker to the Fig. 12 position.

The upper arm 93 of the rocker has a tooth 94 which is swung into the path of a cam or tappet 95 on the power shaft 54; the tappets 95 being spirally arranged and being paired with the tappets 75. The tappets 95 are in different planes from the tappets 75, and the tooth 94 is correspondingly offset from the arm 93. The cam 87 depresses the rear arm 96 of the pawl 78 and elevates the front arm thereof into mesh with the gear 79, and then the tappet 95 camming or acting upon the tooth 94, swings the rocker 93, 85 to the normal midway position at Fig. 11; thus drawing backwardly the pawl 78. At the conclusion of the tens-borrowing operation, the cam 87 releases the rear arm 96 of the pawl, and the forward arm of the latter is drawn down by the spring 91 as before.

Each cam 87, together with its associated tappets 75 and 95, forms a group, and said groups, as seen at Fig. 15, are arranged spirally on the shaft 54, so that the computing wheels are successively operated by the carry-over devices, from lower to higher denominations.

The rocker or tumbler 85, 93, is held in any of its three positions by means of a catch 97 pivoted upon a rod 98, which rod connects the side plates 50, 51, just in front of the rod 55, and said catch is pressed downwardly by a spring 99 coiled around the rod 55; the catch having three notches 100, 101 and 102 to engage a pin 103 on the tumbler to hold the same in any of three positions.

All of the tens-carrying trains are mounted upon the swinging frame 50, 51, and the number of wheels with their pinions, detents 92, gears and tens-carrying trains, swing up and down as a unit about said power shaft 54, which serves as a support for the rear end of said frame, as already explained. The raising of the universal plate 108 restores the index pins 27 to normal positions. The plate 108 is operated in the usual manner, and is pivoted as usual upon bell cranks 109 loosely mounted on rock shafts (116) and connected by a link 110.

During the last part of the return stroke of the general operator, a pawl or abutment 111 on a side bar 30 usually engages an arm 112 secured to one of the rock shafts to cause the shaft to rock, and the plate 108 to rise, thereby lifting the index pins 27. Thereupon the arm 112 trips off from the abutment 111 and the plate 108 drops.

The means for setting said index pin bars 28 forwardly so as to bring the index pins 27 into register with the pin-depressing linkages 26, may be of any suitable construction, and may comprise vertical levers 124 pivoted between their ends at 125, the lower ends of these levers being adapted to strike the rear ends of the index pin bars 28. At their upper ends, these levers are engageable by bevel dogs 126 pivoted upon lugs 127 on the carriage 7; the levers being arranged at letter-space intervals, so that at each letter-feeding movement of the carriage 7, one of the levers 124 is vibrated, and the index pin bar 28 of corresponding denomination is set forwardly, so as to bring its pins within range of the depressors 26.

The levers 124 are so formed that the denominational order of their upper ends is the inverse of their lower ends. The dogs 126 are individually pivoted so as to permit them to ride idly over the ends of the levers 124 while the carriage is being returned.

Returning springs 128 are provided for the levers 124, and pivoted fingers 129 are pressed by springs 130 against shoulders 131 on the index pin bars 28, to return them one after another from the positions to which they are displaced by the levers 124, said fingers 129 riding idly on the top edges of said index pin bars 28 during the wheel driving movements of the latter.

At Fig. 4 is seen a second adding head, totalizer or register 133, comprising a gang of number wheels 134, constructed, equipped and connected like the wheels 38 in the main totalizer (which is designated generally as 132). It will be understood that all the description as heretofore applied to the register 132, inclusive of the tens-carrying mechanism, applies also to the register 133; and Figs. 1, 10 and 11 are drawings of the register 133 as well as of the register 132. The register 133 itself is seen in sectional side elevation at Fig. 7; this register being at the left side of the machine.

The single indexing mechanism already described, and including the single set of index pins 27, answers for both registers 132 and 133. The number wheels 134 are connected to the rack bars 28 to be driven thereby. Connection is effected by means of a series of cross shafts 135, one for each number wheel. Each shaft has a driving pinion 136 meshing with a rack 137 provided upon the bar 28, and a pinion 138 meshing with a similar rack 139, Figs. 6, 7 and 9, on bars 140, which correspond with the bars 28, and have at their forward ends racks 141 and 142 to correspond with the racks 36 and 59 on the bars 28, whereby the pinions 37 of the number wheels 134 are actuated, the same as in the register 132. The bars 140 are not provided with index pins 27, nor with carriage-controlled denomination-selecting devices. The cross-shafts 135 are denominational, the units rack bar 28 being connected by its own cross-shaft with the units bar 140, the tens bar 28 with the tens bar 140, and so on. The cross-shafts 135 may be placed in a row, or one behind another, Fig. 5, to bring the shaft driving racks 137 on the same level, Fig. 3. The bars 140 are guided in forward guide-combs 140ª, and 140ᵇ, and a rear guide comb 140ᶜ.

Whenever any number is run up on the major register 132, the same number may be run up on the sub-register 133; hence the latter may be employed for sub-totals, as for instance, it may give the total of the items on each of a series of bills, while the major totalizer 132 will give the gross sum of the items on all the bills.

Where three or more registers are required, the cross shafts 135 are extended to the additional register or registers, and provided with suitable pinions to drive the same. A third register is shown at 143, Fig. 4, having number wheels and being in all respects similar to registers 132 and 133. This register is operated by bars 145 similar to bars 140, and similarly connected by means of pinions 146 on extensions 147 of the cross-shafts 135.

Each of the major rack bars 28 operates to drive the bars 140 and 145 of the same denomination, to operate corresponding wheels in both registers 133 and 143. All three registers are controlled by a single set of index pins 27, which are selectively set by the numeral keys of the typewriter. The single denomination - selecting mechanism 124, 126, etc., serves for all three registers, and whenever any number is carried into the register 132, it may be simultaneously carried into the registers 133 and 143.

Cam 63 on each of the subtraction shift bars 62, 149 and 153 is provided with a neutralizing surface or portion 151, to hold the shiftable member 63ª in a position midway of the extreme positions to which it may be shifted along the main operating shaft 32, so that both of the cam disks 40 and 64 will be out of reach of the devices 41 and 65, and hence the number wheels will retain their normal positions as at Fig. 18, disengaged from their driving racks during the forward stroke of the general operator effected by the handle 31.

Each cam also has a portion 152 which always holds the member 63ª at the extreme right-hand or subtracting position, as shown by the major register 132 in Fig. 5. At said figure the subtraction key 153 of the left-hand register 133 is shown in its normal position, so that said register 133 performs addition while register 132 is performing subtraction, and while register 143 is silenced or neutral.

Any of the subtraction shift bars 62, 149 and 153 may be in either of its addition, subtraction and neutral positions while each of the other two bars is in either of its three positions. Hence any one of the three registers may either add, subtract, or remain neutral while either one or both of the remaining registers either adds, subtracts, or is silenced. If all of the bars are shifted to the same position as bar 149 in Fig. 5, all three registers will be silenced or remain neutral, so that they will not be disturbed during the operation of the general operator 31; or all may be made to add or all to subtract.

Figure 16:
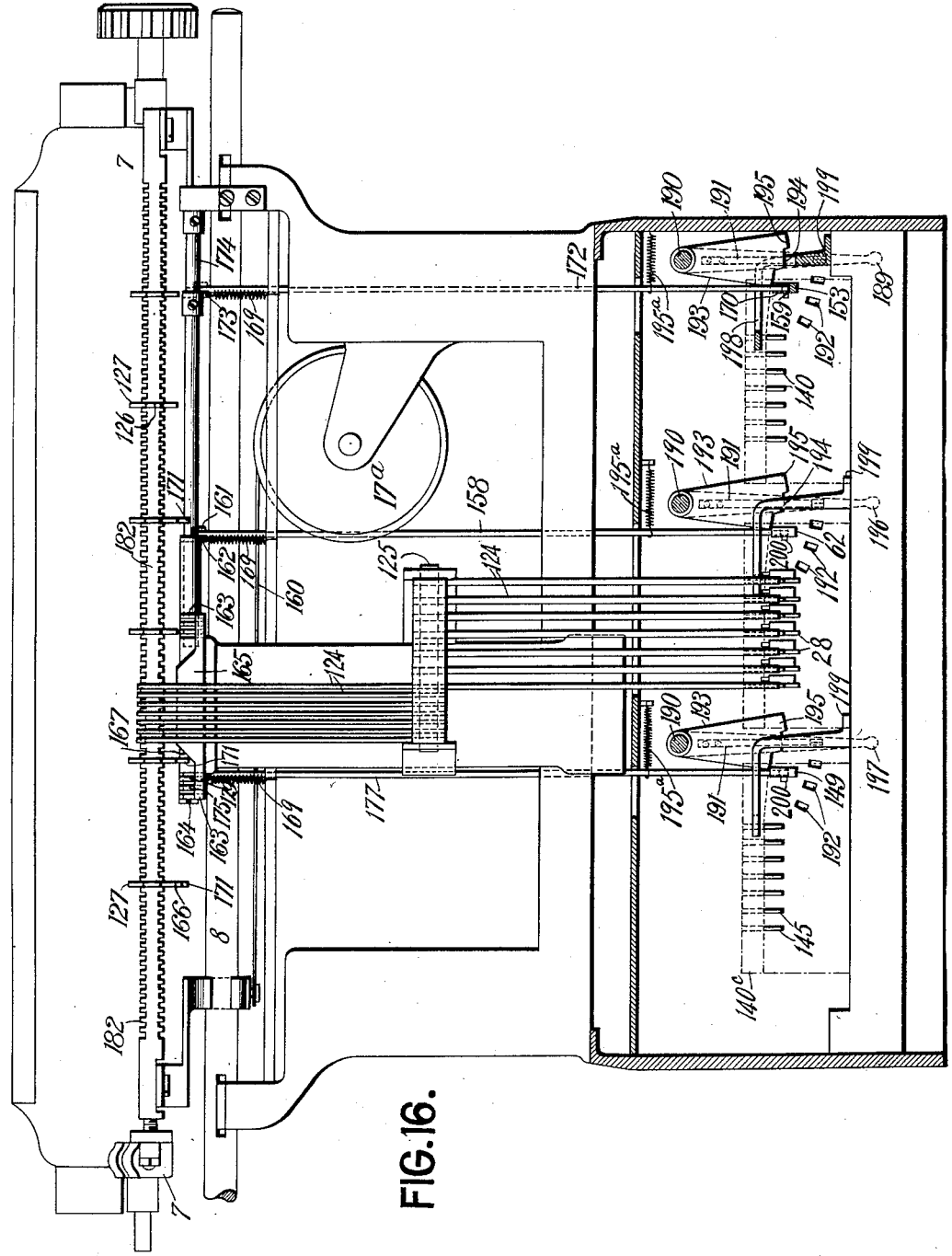
Fig. 16 is a part-sectional rear elevation of the machine, showing the arrangement of combined digit-selecting dogs and condition-determining tappets, as well as the devices operated by said tappets. This view also shows devices for manually controlling the condition of the several registers.

Referring to Fig. 16, additional dogs 126—127 may be provided on the typewriter carriage 7; and these dogs may be adjusted along the rack 182 forming part of the usual tabulating mechanism illustrated at Fig. 3. These dogs may be so adjusted that each will operate the jacks during the writing of the corresponding number in the column, so that two columns may be written on the page, and the corresponding numbers may be carried into the registers.

In now describing the details of operation of the bar 62 which controls the condition of the actuating means for the register 132, so that the latter is caused either to add or to subtract or to remain neutral according to the position of said bar 62, it will be understood that the description applies as well to the other condition-controlling bars, namely 149 and 153, every register having its own condition-controlling or shift bar. And while only three registers and three shift bars are shown, it will be understood that the improvements are also applicable to machines having more than three registers.

The condition-controlling or shift bar 62 is shown at Fig. 3 in normal addition position, this being the rearmost of the three positions which said shift bar may occupy. The shift bar is normally held in its extreme rear position by the general operator. The spring 62ᵇ, however, tends to move said bar forwardly to its subtraction position, which is seen at Fig. 17. A latch 158 is interposed for normally preventing said spring 62ᵇ from moving said shift bar out of addition position at the forward movement of the general operator. While said spring is sufficiently powerful to move the shift bar to operate the cam member 63, still the force required to withdraw the latch 158 (while the shift bar is being held back by the general operator) is very slight, and hence the same may be withdrawn by the movement of the typewriter carriage 7 as it travels in letter-feeding direction, without appreciably retarding the movement of the carriage, which is usually driven by a spring 17ª, the latter connected by a strap 160 to the carriage.

In order to enable the carriage to control the latch, the latter is pivoted at 161 upon an arm 162, which forms an extension of an arm 163 on a bail, said bail hinged at 164 upon a rock shaft 174 mounted upon the framework of the typewriter. The opposite arms 163 of the bail are connected by a cam member 165, which is shown at Fig. 17.

This cam member may be depressed by a tappet 166, formed on the denomination selecting member 127, (which is adjustable along the carriage rack 182). This device 127 may be a flat blade, having a fork to engage the rack 182, and having a dog 126 to engage or select the denomination jacks or levers 124, and also having an extension 166 for operating the cam 165. The latter is seen at Fig. 16 as having a cam edge 167 which is being engaged by one of the tappets 171, whereby during the advance movement of the carriage, the cam is depressed, and the arm 162 is swung up, thus lifting the latch 158 and withdrawing it from the shoulder 159, with which it is normally in engagement, and by which it normally restrains the shift bar 62 from swinging forward. The position of the parts this time is seen at Fig. 17; the latch 158 having been withdrawn and the spring 62$^b$ having drawn the shift bar 62 forwardly a full stroke, thus forcing the portion 152 of the cam member 63 to effect the shifting of the sleeve 63$^a$ to subtracting position, as seen at Fig. 17, and also at the middle portion of Fig. 5. Hence, a movement of the paper carriage 7 has determined that the register 132 shall subtract at the movement of the general operator. It will be understood that the displacement of the cam 165 may also be effected by a return movement of the carriage, so that whenever the carriage is in the computing zone, it determines the position to be occupied by the shift bar.

Upon the return movement of the general operator, its cross bar 29 engages a lug 168 on this shift bar 62, and drives the same back against the tension of spring 62$^b$, and restores the same to its normal extreme rear position; the latch 158 being returned by a spring 169 to a position forward of the shoulder or catch 159 on the shift bar; so as to be ready to restrain the shift bar 62 upon the next operation of the general operator, in case subtraction is not to be performed upon the associated register 132 at the next computing operation. The shift bar or condition-controlling member 62 may therefore be normally in addition position, but may be easily released by the carriage to be power-driven to subtraction position.

The cam 165 is of sufficient length to hold the latch 158 elevated as at Fig. 17, during the entire time that the paper carriage 7 is in this particular computing zone, so that if the general operator handle 31 is actuated at any time while the carriage is in or bordering upon this zone, the register in question will perform subtraction.

The shift or condition-controlling bar 62 is also provided with a shoulder 170, which may be brought into requisition for holding the shift bar 62 in its midway position, to silence the associated register at the actuation of the general operator. For this purpose the latch 158 is not entirely withdrawn from the shift bar 62, but is lifted to a medium position, as at Fig. 18, to intercept the shift bar 62 at the time that it is in the position seen at the lower portion of Fig. 5, with the sleeve 63$^a$ shifted to a midway idle position.

This short stroke of the latch 158 is effected by the tappet 166, Fig. 18, which does not project down so much as the tappet 171, so that the cam bar 165 is only a little depressed, and hence the latch 158 is permitted to intercept the shoulder 170.

Each of the other two registers is also controlled by the carriage in like manner. The shift bar 153 has a latch 172, pendent from an arm 173, which is fixed on the rock shaft 174, to which is secured a bail 175, having a cam 176 forward of the cam 165; and the shift bar 149 has a latch 177, pendent from an arm 178 that projects forwardly from the bail 179, the latter having a cam 180 forward of cam 176. These cam bails may be nested, as seen in the plan at Fig. 21, and may be mounted concentrically upon the shaft 174, and may also have at their other ends a common bearing on a shoulder screw 181; all the bails being loose on shaft 174 except bail 175, which is fixed thereto. The two shift bars just mentioned have the same construction and operation as shift bar 62; and the same is true of the latches, which are similar in construction and operation to latch 158.

At Fig. 21, it will be seen that by having the cams 165, 176 and 180 placed closely one behind another, it becomes practicable to use a single tappet for controlling all three cams. Said tappet may have any of the forms seen at Fig. 19. The first device seen at said figure, is merely a column stop or column selector. The one below that is not only a combined column selector and denomination selector, but also controls the three cams 165, 176 and 180 allowing them all to remain in normal position when the carriage is in the adding zone, by not withdrawing any of the latches 158, 172 and 177 from their normal restraining positions, Fig. 3. Since all three registers will perform adding, when said tappet is used, it is marked "AAA."

The third device is the same as the second, except that at its rear extremity there is a downward projection 166 marked "N." When this tappet is used, it will depress the rear cam 165 a little, whereby the middle latch 158 is withdrawn to the Fig. 18 position, so that the middle register will remain dormant at the computing operation, while each of the other registers adds.

The next tappet beneath has a longer downward projection 171, which is marked "S," since this will depress the cam 165 to the subtraction position, as at Fig. 17, thus withdrawing the latch 158 entirely, whereby subtraction is performed upon the middle register at the computing operation, while addition is performed upon each of the other registers.

The next tappet shows a projection marked "N" for neutral, this projection being over the second cam, which is marked 176, so that the upper register 133 at Fig. 5 will remain neutral while both the other registers add at the computing operation. The next tappet is used for having the register 143 add while the other two registers are neutral, and so on throughout the set; all of the tappets being marked to indicate the result to be accomplished by their use.

At Fig. 16, several of the combination column stops, denomination-selectors and condition-determining devices are shown adjusted along the rack 182 of the carriage, for locating the positions of the successive columns on the work sheet, and also controlling the selection of the denomination jacks 124 and also determining what each column of each of the registers shall do, whether add, subtract, or be silenced.

The operator may be provided with several sets of devices seen at Fig. 19, and use them in any desired combination at any desired intervals along the rack 182, so that a great variety of combinations is rendered feasible.

The usual decimal tabulator stops are seen at 183, Figs. 3 and 21, the same being operable by keys 184, and also having shoulders 185 to operate a pivoted device 186, to depress a link 187 and swing a lever 188 to lift the rack 9 from engagement with the pinion 10, so that the carriage may be driven along by its spring 17$^a$, as usual in tabulating operations.

The condition of each register may also be manually controlled by means of a handle, which may be at the front of the machine, Figs. 3, 16, 20, 22 and 23. Normally the handle may hang vertically from a rock shaft 190, a spring detent 191 on the handle engaging a notch 192 formed on the framework.

When the handle 189, which is here shown as applied to register 133 is swung to the right, Fig. 20, an arm 193 on the rear end of the rock shaft 190, shoulders the latch 172 to one side, free of its shift or condition-controlling bar 153, so that its spring 62$^b$ may, at the ensuing forward movement of the general operator handle 31, drive it forwardly to the extreme position seen at Fig. 17, so that the register 133 shall perform subtraction. But if, before operating the general operator, the user desires that this register 133 shall remain neutral, he shifts the handle 189 a little farther to the right, as at Fig. 22, so that a projection 194 on the arm 193 shall obstruct the path of the shoulder 170 on the shift bar 153, so that the latter moves only to midway neutral position. Or if he desires that this register shall add, he moves the handle 189 to the extreme position seen at Fig. 23, to bring a projection 195 in a position forward of the shoulder 159 on said switch 153, so that the latter shall not advance with the general operator, but shall maintain a position seen at the upper part of Fig. 5, and hence addition may be performed on this register.

There are four of the notches 192 in each set, so that the detent 191 may hold the handle 189 in any position to which the operator shifts it from the normal ineffective position seen at Fig. 16; and the notches may be marked for addition, neutral and subtraction, as shown. Therefore, if at any time the operator wishes to discontinue the control of any of the shifting mechanisms by the carriage, he merely needs to adjust the handle 189 to the desired position, where it will stay during the remainder of the time that the combined typewriting and computing machine is operated. If he should set it at the neutral position, it would have the effect of permanently silencing the register throughout the use of the machine. Upon restoring the handle to normal position, a spring 195$^a$ returns the latch to normal position.

It will be seen at Fig. 16, that permanent handles 196 and 197, similar in construction and operation to handle 189, are provided for the other two registers 132 and 143; so that the operator can silence any one or more registers regardless of the others, and can manually control their condition independently of the typewriter carriage, and can have such control mechanically maintained throughout the remainder of the operation of the machine.

Each of the latches may swing in a transverse guide slot 198 in a bracket 199, and the arms 193 may also be guided in these slots. The edge of the slot supports the latch against displacement when the latter is pressed forwardly by the shift bar. The forward stroke of each shift bar may be limited by a pin 200 thereon striking the guide-comb 140$^c$.

The claims in this case are limited to features not disclosed in the application of Ogden Minton, Serial No. 797,714, filed October 28, 1913; the invention of said Minton being prior to mine.

Variations may be resorted to within the scope of the invention, and portions of the improvements may be used without others.

Having thus described my invention, I claim:

1. In a computing machine, the combination, with a plurality of registers, and actuating means therefor; of state-control mechanism individual to each register; a lock for each state-control mechanism; a set of releasing devices, one for each lock, grouped close together on the frame of the machine; a traveling carriage; and carriage-carried means arranged to selectively engage and operate any or all of said releasing devices at a given point in the traverse of the carriage.

2. In a computing machine, the combination, with a plurality of registers, and actuating means therefor; of state-control mechanism individual to each register; a lock for each state-control mechanism; a set of releasing devices, one for each lock, mounted on the frame of the machine and comprising nested bails; a traveling carriage; and carriage-carried means arranged to selectively engage and operate any or all of said bails at a given point in the traverse of the carriage.

3. In a computing machine, the combination, with a plurality of registers, and actuating means therefor; of state-control mechanism individual to each register; a lock for each state-control mechanism; a set of releasing devices, one for each lock, mounted on the frame of the machine and comprising nested bails and a system of operating connections ramifying from said bails to said locks; a traveling carriage; and carriage-carried means arranged to selectively engage and operate any or all of said bails at a given point in the traverse of the carriage.

4. In a computing machine, the combination, with a plurality of registers, and actuating means therefor; of state-control mechanism individual to each register; a lock for each state-control mechanism; a set of releasing devices, one for each lock, mounted on the frame of the machine and comprising nested, concentrically-disposed depressible bails and a system of operating connections ramifying from said bails to said locks; a traveling carriage; and carriage-carried means arranged to selectively engage and operate any or all of said bails at a given point in the traverse of the carriage.

5. In a computing machine, the combination, with a plurality of registers, and actuating means therefor; of a state-control mechanism individual to each register and including a controller arranged to move automatically in one direction; a lock normally holding each controller against movement; a set of releasing devices, one for each lock, grouped close together on the frame of the machine; a traveling carriage; and carriage-carried means arranged to selectively engage and operate any or all of said releasing devices at a given point in the traverse of the carriage.

6. In a computing machine, the combination, with a plurality of registers, and actuating means therefor; of a state-control mechanism individual to each register and including a controller arranged to move automatically in one direction; a lock normally holding each controller against movement; a set of devices, one for each lock, grouped close together and arranged to selectively release the locks either partly, or wholly from the corresponding controllers, thereby to govern the extent of the automatic movement of the latter; a traveling carriage; and carriage-carried means arranged to selectively engage and operate any or all of said releasing devices at a given point in the traverse of the carriage.

7. The combination, with a plurality of registers, and actuating means therefor; of state-control mechanism individual to each register for causing either addition or subtraction to be performed thereon, each state-control mechanism including a controlling member; means individual to each of said members for holding the same against movement; a set of releasing devices, one for each holding means, grouped close together; a traveling carriage; and means on said carriage arranged to selectively engage any or all of said releasing devices at a given point in the traverse of the carriage.

8. The combination, with a plurality of registers, and actuating means therefor; of state-control mechanism individual to each register for either silencing the same or causing either addition or subtraction to be performed thereon, each state-control mechanism including a controlling member; means individual to each of said members for holding the same against movement; a set of releasing devices, one for each holding means, grouped close together; a traveling carriage; and means on said carriage arranged to selectively engage any or all of said releasing devices at a given point in the traverse of the carriage.

9. The combination, with a plurality of registers, and actuating means therefor; of state-control mechanism individual to each register for causing either addition or subtraction to be performed thereon, each state-control mechanism including a controlling member; means individual to each of said members for normally holding the same in addition position, said members being movable automatically to subtraction position when released from said holding means; a set of releasing devices, one for each holding means, grouped close together; a traveling carriage; and means on said carriage arranged to selectively engage any or all of said releasing devices at a given point in the traverse of the carriage.

10. The combination, with a plurality of registers, and actuating means therefor; of state-control mechanism individual to each register for either silencing the same or causing either addition or subtraction to be performed thereon, each state-control mechanism including a controlling member; means individual to each of said members for normally holding it in addition position; a set of devices, one for each holding means, grouped close together for partly or wholly releasing said members from said holding means, said members being movable automatically to subtraction position when wholly released, and to silencing position when partly released; a traveling carriage;

and means on said carriage arranged to selectively engage any or all of said releasing devices at a given point in the traverse of the carriage.

11. The combination, with a plurality of registers normally performing addition, and actuating means therefor; of mechanism individual to each register for causing the same to perform subtraction; a lock for each of said mechanisms; a set of releasing devices, one for each lock, grouped close together on the frame of the machine; a traveling carriage; and carriage-carried means arranged to selectively engage and operate any or all of said releasing devices at a given point in the traverse of the carriage.

12. The combination, with a plurality of registers normally performing addition, and actuating means therefor; of mechanism individual to each register for silencing the same; a lock for each of said mechanisms; a set of releasing devices, one for each lock, grouped close together on the frame of the machine; a traveling carriage; and carriage-carried means arranged to selectively engage and operate any or all of said releasing devices at a given point in the traverse of the carriage.

13. The combination, with a plurality of registers normally performing addition, and actuating means therefor; of mechanism individual to each register for either silencing the same or causing it to perform subtraction; a lock for each of said mechanisms; a set of releasing devices, one for each lock, grouped close together on the frame of the machine; a traveling carriage; and carriage-carried means arranged to selectively engage and operate any or all of said releasing devices at a given point in the traverse of the carriage.

14. The combination with a register, a general operator therefor, and means controllable by said general operator for either silencing said register or causing it to perform either addition or subtraction, of a shifter movable to two effective positions from normal position, a spring tending to throw said switch, a latch to restrain said shifter, and a carriage having means to set said latch to two different positions for variably controlling said shifter; said switch being restorable by said general operator.

15. In a computing machine, the combination, with a plurality of registers, and actuating means therefor; of a shiftable state-control device individual to each register; a shifter for each state-control device; a spring connected to actively drive each shifter; a latch for restraining each shifter; a set of releasing devices, one for each latch, grouped close together on the frame of the machine; a traveling carriage; and carriage-carried means arranged to selectively engage and operate any or all of said releasing devices at a given point in the traverse of the carriage.

16. In a computing machine, the combination, with a plurality of registers, and a general operator for actuating them; of a set of shiftable state-control devices, one for each register, operable by said general operator; a shifter for each state-control device; a spring connected to actively drive each shifter; a latch for restraining each shifter; a set of releasing devices, one for each latch, grouped close together on the frame of the machine; a traveling carriage; and carriage-carried means arranged to selectively engage and operate any or all of said releasing devices at a given point in the traverse of the carriage, said shifters being restorable by said general operator.

17. In a computing machine, the combination, with a plurality of registers, and actuating means therefor; of a shiftable state-control device individual to each register; a shifter for each state-control device; a spring connected to actively drive each shifter; a latch for restraining each shifter; a set of releasing devices, one for each latch, grouped close together on the frame of the machine; a traveling carriage; and a tappet on said carriage arranged to selectively engage and operate any or all of said releasing devices at a given point in the traverse of the carriage, each releasing device being prolonged to enable it to be controlled by the tappet the entire time that the carriage is in the computing zone.

18. In a computing machine, the combination, with a plurality of registers, and actuating means therefor; of a shiftable state-control device individual to each register; a shifter for each state-control device; a spring connected to actively drive each shifter; a latch for restraining each shifter; a set of releasing devices, one for each latch, grouped close together on the frame of the machine; a traveling carriage; and a series of dissimilar tappets on said carriage for variously operating said releasing devices at different points in the traverse of the carriage.

19. In a computing machine, the combination, with a plurality of registers, and a general operator for actuating them; of a set of shiftable state-control devices, one for each register, operable by said general operator; a shifter for each state-control device; a spring connected to actively drive each shifter; a latch for restraining each shifter; a set of releasing devices, one for each latch, grouped close together on the frame of the machine; a traveling carriage; and carriage-carried means arranged to selectively engage and operate any or all of said releasing devices at a given point in the traverse of the carriage, said latches being movable to different positions when released by said releasing devices, so as to control the extent of movement of the associated shifters by their driving springs.

20. The combination with a computing head, and means to actuate the same; of means for changing the condition of the actuating means to cause either addition or subtraction to be performed, or to render the computing head actuating means ineffective on said computing head; a member to control the condition changing means, said member capable of assuming three positions and normally occupying one of them; a spring tending to drive said member; a latch for restraining said member, said latch movable to one position to permit a limited movement of said member and to a different position to permit a full movement of said member; a carriage; and means operable by said carriage for controlling the movement of the latch.

21. In a combined typewriting and computing machine, the combination with a traveling carriage and a plurality of registers, of means whereby said carriage automatically determines separately for each one of said registers at any point whether it shall add, subtract or be neutral, manual means for controlling each register, and connections such that the setting of the manual means to addition, subtraction or neutral for any register, shall make the automatic means for that register ineffective.

22. The combination with a series of registers; of actuating means therefor; a carriage; means controlled by the carriage to determine whether addition or subtraction shall be performed on each register; and separately-operable manual means individual to each register and operable manually independently of the other registers, for silencing the associated carriage-controlled determining means.

23. The combination of a series of registers; actuating means therefor; a carriage; means controllable by the carriage to determine whether addition or subtraction shall be performed on each register; and separately-operable manual means individual to each register and operable manually independently of the other registers, for silencing the associated carriage-controlled determining means, and concomitantly setting its associated register actuating means for either addition or subtraction.

24. The combination with a register and means to actuate the same, of means for changing the condition of the actuating means to cause either addition or subtraction to be performed, or to render the register actuating means ineffective on said register, a member to control the condition-changing means, said member capable of assuming three positions and normally occupying one of said positions, a spring tending to drive said member, a latch for restraining said member, said latch movable to one position to permit a limited movement of said member, and to a different position for permitting a full movement of said member, a carriage, means operable by said carriage for controlling the movement of the latch, and a general operator having means to restore said member after actuation.

25. The combination with a register and actuating means therefor, of a general operator for said actuating means, means for changing the condition of the actuating means to cause either addition or subtraction to be performed, said general operator having means for actuating said condition-changing means, a member to control the condition-changing means, a spring tending to actively drive said member, a carriage, a latch for restraining said member normally engaged therewith but releasable by said carriage, and means to restore said member by said general operator after actuation.

26. The combination with a register and actuating means therefor, of means for changing the condition of the actuating means to cause either addition or subtraction to be performed, or to neutralize the actuating means, a member to control the condition-changing means, a spring tending to actively drive said member, a carriage, means releasable by the carriage for restraining said member, and a general operator having means to positively restore said member after actuation.

27. The combination with a register and actuating means therefor, of means for changing the condition of the actuating means to cause either addition or subtraction to be performed, or to neutralize the actuating means, a member to control the condition-changing means, a spring tending to actively drive said member, a carriage, and carriage-controlled means normally holding said member in addition position but releasable by said carriage to permit the movement of said member into either neutral or subtraction position.

28. The combination with a register and actuating means therefor, of means for changing the condition of the actuating means to cause either addition or subtraction to be performed, or to neutralize the actuating means, a member to control the condition-changing means, a spring tending to actively drive said member, a carriage, carriage-controlled means normally holding said member in addition position but releasable by said carriage to permit the movement of said member into either neutral or subtraction position, and a general operator having means to positively restore said member after actuation.

29. The combination with a register and actuating means therefor, of means for changing the condition of the actuating means to cause either addition or subtraction to be performed, or to neutralize the actuating means, a member to control the condition-changing means having a pair of shoulders, one of which corresponds to the addition position of said member and the other to its neutral position, a latch normally engaging one shoulder, a spring tending to actively drive said member, and means associated with said latch for alternatively engaging the same with the other shoulder or releasing it completely from said member, to permit the latter to be driven by said spring into either neutral or subtraction position.

30. The combination with a register and actuating means therefor, of means for changing the condition of the actuating means to cause either addition or subtraction to be performed, or to neutralize the actuating means, a member to control the condition-changing means having a pair of shoulders arranged one in front of the other, the front shoulder corresponding to the addition position of said member and the rear shoulder to its neutral position, a latch normally engaged with the front shoulder, a spring tending to actively drive said member, and means associated with said latch to alternatively engage the same with the rear shoulder, or release it completely from said member, to permit the latter to be driven by said spring into either neutral or subtraction position.

31. The combination with a register and actuating means therefor, of means for changing the condition of the actuating means to cause either addition or subtraction to be performed, or to neutralize the actuating means, a member to control the condition-changing means having a pair of shoulders, one of which corresponds to the addition position of said member and the other to its neutral position, a latch normally engaging one shoulder, a spring tending to actively drive said member, a carriage, and carriage-controlled means for alternatively engaging said latch with the other shoulder, or releasing it completely from said member, to permit the latter to be driven by said spring into either neutral or subtraction position.

32. The combination with a register and actuating means therefor, of means for changing the condition of the actuating means to cause either addition or subtraction to be performed, or to neutralize the actuating means, a member to control the condition-changing means having a pair of shoulders arranged one in front of the other, the front shoulder corresponding to the addition position of said member, and the rear shoulder to its neutral position, a latch normally engaged with the front shoulder, a carriage, a spring tending to actively drive said member, and carriage-controlled means for alternatively engaging said latch with the rear shoulder, or releasing it completely from said member, to permit the latter to be driven by said spring into either neutral or subtraction position.

33. The combination with a register and actuating means therefor, of means for changing the condition of the actuating means to cause either addition or subtraction to be performed, or to neutralize the actuating means, a member to control the condition-changing means, a spring tending to actively drive said member, a latch to restrain the said member, a lever operatively connected to said latch, a carriage, carriage-controlled means for rocking said lever to release said latch, and a general operator having means to positively restore said member after actuation.

34. The combination with a register and actuating means therefor, of means for changing the condition of the actuating means to cause either addition or subtraction to be performed, a member to control the condition-changing means, a spring tending to actively drive said member, a latch to restrain said member, a rocking bail comprising a cam having a dwell and having one arm extended and connected to said latch, a carriage, and a tappet on said carriage arranged to engage the cam and dwell portion of said bail, to rock the same and release said latch from said member.

35. The combination with a register and actuating means therefor, of means for changing the condition of the actuating means to cause either addition or subtraction to be performed, a member to control the condition-changing means, a spring tending to actively drive said member, a latch to restrain said member, a rocking bail comprising a cam having a dwell and having one arm extended and connected to said latch, a carriage, a tappet on said carriage arranged to engage the cam and dwell portion of said bail, to rock the same and release said latch from said member, and a general operator having means to positively restore said member after actuation.

36. The combination with a register and actuating means therefor, of means for changing the condition of the actuating means, to cause either addition or subtraction to be performed, or to neutralize the actuating means, a member to control the condition-changing means having a pair of shoulders of different heights, the lower shoulder corresponding to the addition position and being arranged in front of the higher shoulder, which corresponds to its neutral position, a vertical latch normally engaged with the front shoulder, a spring tending to actively drive said member forward, and means associated with said latch for alternatively raising it to extents sufficient to engage it with the rear shoulder or to clear the same.

37. The combination with a register and actuating means therefor, of means for changing the condition of the actuating means, to cause either addition or subtraction to be performed, or to neutralize the actuating means, a member to control the condition-changing means having a pair of shoulders of different heights, the lower shoulder corresponding to the addition position and being arranged in front of the higher shoulder, which corresponds to its neutral position, a vertical latch normally engaged with the front shoulder, a spring tending to actively drive said member forward, a carriage, and means controlled by the carriage for alternatively raising the latch to extents sufficient to engage it with the rear shoulder or to clear the same.

38. The combination with a register and actuating means therefor, of means for changing the condition of the actuating means to cause either addition or subtraction to be performed, or to neutralize the actuating means, a member to control the condition-changing means movable to two effective positions from normal position, a spring tending to actively drive said member, means to restrain said member, and a normally-ineffective, manually-operable device for releasing said restraining means and itself setting said member to either of such positions.

39. The combination with a register and actuating means therefor, of means for changing the condition of the actuating means to cause either addition or subtraction to be performed, or to neutralize the actuating means, a member to control the condition-changing means movable to two effective positions from normal position, a spring tending to actively drive said member, a latch for restraining said member settable to two different positions for variably controlling said member, and a manually-operable device for releasing said latch, itself settable to the same positions as the latch.

40. The combination with a register and actuating means therefor, of means for changing the condition of the actuating means to cause either addition or subtraction to be performed, or to neutralize the actuating means, a member to control the condition-changing means capable of assuming three different positions and normally occupying one of them, a spring tending to actively drive said member, a latch for controlling the movement of said member to any one of said positions, and a manually-operable member movable to release said latch and itself control the movement of said member.

41. The combination with a register and actuating means therefor, of means for changing the condition of the actuating means to cause either addition or subtraction to be performed, a member to control said condition-changing means, a spring to actively drive said member, a latch to restrain said member, a carriage having means to automatically release said latch, and a manually-operable device movable into position to immediately release said latch and itself restrain said member.

42. The combination with a register and actuating means therefor, of means for changing the condition of the actuating means to cause either addition or subtraction to be performed, a member to control said condition-changing means, a spring to actively drive said member, a latch to restrain said member normally engaged therewith, a carriage having means to automatically release said latch, and a manually-operable rocker successively engageable with said latch and said member, to release the former and itself restrain the latter.

43. The combination with a register and actuating means therefor, of means for changing the condition of the actuating means to cause either addition or subtraction to be performed, or to neutralize said actuating means, a member to control said condition-changing means capable of assuming three different positions corresponding to the three conditions of the actuating means and normally occupying one of them, a spring tending to actively drive said member, a latch to control the positioning of said member, a carriage having means to set said latch with relation to said member, and a manually-operable device movable to directly release said latch and itself control the positioning of said member.

44. The combination with a register and actuating means therefor, of means for changing the condition of the actuating means to cause either addition or subtraction to be performed, or to neutralize the actuating means, a member to control the condition-changing means capable of assuming three positions corresponding to the three conditions of the actuating means, a spring tending to actively drive said member, a carriage, and separate carriage-controlled and manually-operable devices for controlling the position of said member.

45. The combination with a register and actuating means therefor, of shiftable means for changing the condition of the actuating means, a shifter bar for operating said shiftable means, a spring tending to actively drive said bar, a latch normally engaged with said bar to restrain the same, a carriage, and separate carriage-controlled and manually-operable devices for immediately engaging said latch to release it from said bar; the manually-operable device being arranged to engage said member after having released said latch.

BURNHAM C. STICKNEY.

Witnesses:
  TITUS H. IRONS,
  F. E. ALEXANDER.